Patented Sept. 3, 1940

2,213,809

UNITED STATES PATENT OFFICE 2,213,809

METHOD OF TREATING FRUITS, BERRIES, TREES, PLANTS, AND THE LIKE

Robert B. Dustman, Morgantown, W. Va.

No Drawing. Application December 29, 1938, Serial No. 248,315

15 Claims. (Cl. 47—58)

This invention relates to a method of and materials for the treatment of fruits and the aerial parts of fruit-bearing plants with the general object of improving the color, appearance, flavor, keeping quality and/or other desirable characteristics of the fruit borne.

With fruits which depend upon an exposure to natural sunlight for their coloration, such coloration up to this time has been controlled in part by such agricultural processes as pruning the branches, or vines, thinning the fruits, fertilizing the plants, and increasing the exposure to light. Certain methods have heretofore been proposed for agricultural purposes, involving a combination heating, cooling, fumigating, irrigating, and fertilizing system for the treatment of fruit trees.

Other agricultural methods have been proposed for treating seeds, bulbs, tubers and roots, by applying thereto a coating forming a water-permeable membrane containing a substance harmelss to plant life and adapted to pass into the sap of the plant under treatment, in order to produce a desired color in the plant. This latter type of agricultural treatment is not designed for the treatment of fruits, berries and the like. Coloring of the plants is obtained from dyes and pigments, or by the formation of pigments from separately applied materials adapted to react with each other to produce pigments in the sap of the plants.

This invention has for one of its objects the provision of a simple method involving the use of chemical catalytic substances applied as sprays in order to produce an improvement in the color, appearance, flavor, keeping quality and other desirable characteristics of fruits, including berries and similar agricultural products.

Another object of the invention is to provide a method for treating pigment-bearing fruits, including berries and the like, particularly fruits containing red, blue or purple coloration, in order to increase the amount of pigment or to increase the relative extent of surface showing pigment and to improve the quality of brightness.

A further object of this invention is to provide a method for treating fruits, including berries and the like, to improve the general appearance, other than the color, and to improve particularly those properties relating to increased smoothness, and to reduction of size, prominence and number of lenticels.

Still another and further object of this invention is to provide a method for hastening the ripening process of various types and kinds of fruits.

An additional object of this invention is to provide an improvement in the keeping qualities of various types of fruits and to increase their ability to withstand storage with few losses due to scald, internal breakdown, rot or other deterioration associated with storage.

A further object of this invention is to provide an improved agricultural method of treatment adapted to improve the flavor of some varieties of fruits.

A still further object of this invention is to provide a method of producing positive catalytic influence on the normal pigmentation process of fruit and for sensitizing the normal photo-chemical process whereby anthocyanine pigments are produced by plants or plant parts. Other objects will appear hereinafter.

The invention comprises a new and improved art of treatment, by spraying or otherwise treating plants, including trees, bushes, branches, vines or other plant parts, with materials exerting a positive catalytic influence on the normal pigmentation process of plants or the plant parts and adapted to sensitize the normal photo-chemical process whereby anthocyanine pigments are produced in the fruit borne.

In practice I have found that this invention is especially applicable to the treatment by spraying, while on the tree, bush, branch or vine, of young, partially developed or fully developed fruits including berries with solutions of materials having the aforementioned catalytic influence and containing a thiocyanic acid radical, and more particularly with solutions or emulsions of compounds comprising a basic salt-forming radical combined with a thiocyanic acid radical. The basic or salt-forming group may be, for example, an inorganic or an organic group, including sodium, potassium, calcium, magnesium, ammonium, copper, lead, nicotine and the like. In all of my tests which have been made thus far, satisfactory results have been obtained with all compounds of the character described, regardless of whether the basic salt-forming group was an inorganic or an organic radical. The results with some compounds, however, are more satisfactory than with others. Thus, while the ammonium thiocyanate gave a pronounced effect on pigmentation, it tended to have some pitting effect. The preferred treating materials for the purpose of my invention are the inorganic thiocyanate solutions and particularly solutions of the alkali metal and alkaline earth metal thiocyanates. Nicotine thiocyanate gave a similar, but less pronounced, effect.

The concentration may range from a few hundredths of a per cent by weight to as much as 0.5%, 1%, or even more, although burning of foliage and fruit are more likely to occur with the higher concentrations. The most desirable concentrations so far employed have been around 0.1% to 0.2%. Applications are made with ordinary spray equipment as in spraying with the usual insecticides and fungicides. The thiocyanate may be applied alone or it may be combined with other common spray materials such as calcium arsenate, lead arsenate, summer strength lime sulfur, flotation sulfur, or Bordeaux mixture.

The time of application may range over a large portion of the growing season from the time the fruits are well formed until full maturity is reached. The number of applications likewise may be varied to suit the kind of fruit, the conditions of the weather, and the season of the year. Under normal weather conditions desirable results have been obtained with apples with from three to five sprays applied at intervals of approximately one week. In applying the spray it is not sufficient to spray the foliage alone but the spray should come in contact with, and cover the surfaces of, the fruits themselves.

The treatment is particularly effective on red or blushed varieties of apples such as Rome Beauty, Stayman Winesap, Delicious, Jonathan, York Imperial, McIntosh, Rambo, Red Astrachan, Winesap and Duchess. It increases considerably the amount of blush on such varieties as Golden Delicious, Maiden Blush and Grimes Golden. Even varieties entirely devoid of red color when mature, such as Yellow Transparent and Early Harvest, nevertheless as a result of this treatment may be caused to mature several days or weeks earlier than untreated fruits thus gaining the advantage of the earlier market. The word "mature" is here used to describe the change of green color normally occurring in the unripe fruit to the yellow color occurring in the ripened fruit.

Organic thiocyanates of the type R CNS, where R is either a saturated or unsaturated aliphatic hydrocarbon radical such as the methyl, ethyl, ethylene, isopropyl, n-butyl, lauryl and like radicals are not effective in any concentrations suitable for spray work. In fact they are not only devoid of desirable effects but in addition are actually objectionable in odor, flavor, and irritant effect. These organic thiocyanates of the type just mentioned apparently have no effect in influencing the formation of anthocyanine pigments. On the other hand, the inorganic thiocyanates, such as sodium and potassium thiocyanate, are not customarily employed as insecticides, and in general are unsuited for this purpose. Organic thiocyanates, such as nicotine thiocyanate, which is mentioned herein as suitable for the practice of the present invention, have been employed largely as a spray for insects of the aphis type on shrubs and small plants and, as far as I am aware, have not previously been employed in the treatment of fruits including berries or of plants bearing fruits including berries.

Apples removed from the branches and exposed to sunlight in a favorable location for a period of two weeks during which period they were sprayed frequently with inorganic thiocyanate solutions likewise colored better than similarly exposed but unsprayed fruits. However, the results of this method of treatment were much less satisfactory than where the spray solutions were applied to the growing fruits while the latter were still attached to the tree.

The specific advantages which may be obtained as a result of treatment of fruits on the tree, vine or bush may be enumerated as follows:

(1) A hastening of the ripening process resulting in an earlier maturity. This was obtained with both cherries and apples. As previously indicated, a substantial hastening of the ripening process resulting in earlier maturity, was also obtained with Yellow Transparent apples and other apples devoid of red color, thus demonstrating that the treatment herein described has advantages other than those involving an improvement in red pigmentation.

(2) A material increase in the amount of red pigment produced and in the relative extent of surface covered by the pigment.

(3) An improvement in the quality or brightness of the red pigment, it being more pleasing to the eye than that of the untreated fruits which are duller.

(4) An improvement in the general appearance of the fruit. The Stayman Winesap apple for instance showed fewer lenticels, and these were much less prominent on the surface of the treated fruits, giving them a smoother and more attractive appearance.

(5) An improvement in keeping quality apparently due, at least in part, to a thickening of the skin and a reduction of the lenticels. Apples stored near freezing temperatures over periods of six to fourteen months showed decidedly better keeping quality with lesser tendency to shrivel, scald, and rot than untreated fruits.

(6) A sensitization of the fruit to the normal photo-chemical process whereby the pigment is produced.

(7) An improved flavor with some varieties.

(8) Compatibility of this treatment with other spray materials and practices in common use.

Having thus described the invention, what I wish to claim as new is:

1. A method of treating the fruit and other aerial parts of fruit-bearing plants, which comprises applying thereto a material containing a thiocyanic acid radical and capable of exerting a positive catalytic influence on the normal pigmentation process of the fruit borne, said material being applied in amounts effective in altering at least one of the properties of color, appearance, maturity, keeping quality and flavor of said fruit.

2. A process which comprises treating the fruit and the aerial parts of fruit-bearing plants with compounds consisting of a basic salt-forming radical combined with a thiocyanic acid radical, in amounts effective in altering at least one of the properties of color, appearance, maturity, keeping quality and flavor.

3. A method for increasing the amount of pigment produced naturally by fruits showing varying shades of red, purple and blue, which comprises applying to the foliage and other aerial parts of the fruit-bearing plants substantially soluble compounds consisting of a basic salt-forming radical combined with a thiocyanic acid radical.

4. A method for altering the color of fruits, which comprises treating the fruits and the aerial parts of the fruit-bearing plants with substantially soluble compounds consisting of a basic salt-forming radical combined with a thiocyanic acid radical.

5. A method of increasing the relative extent of surface showing red, purple and blue pigments in fruits normally showing partial pigmentation, which comprises applying thereto during the growing season soluble compounds consisting of a basic salt-forming radical combined with a thiocyanic acid radical.

6. A method for improving the general appearance of a fruit and relating to increased smoothness and reduction of the size, prominence and number of lenticels, which comprises applying to the fruit-bearing plants during the growing season, compounds consisting of a basic salt-forming radical combined with a thiocyanic acid radical.

7. A method of treating fruits which comprises applying thereto an inorganic thiocyanate in amounts effective in altering at least one of the properties of color, appearance, maturity, keeping quality and flavor of the fruit.

8. A method of treating apples and apple trees during the growing season, which comprises applying thereto a soluble thiocyanate consisting of a basic salt forming radical combined with a thiocyanic acid radical in amounts effective in altering at least one of the properties of color, appearance, maturity, keeping quality and flavor of the apple.

9. A method of treating apples of the variety naturally showing varying shades of red, purple and blue, which comprises applying to the apples and apple trees during the growing season substantially soluble inorganic thiocyanates in amounts effective in altering at least one of the properties of color, appearance, maturity, keeping quality and flavor of the apple.

10. A method for increasing the amount of pigment in apples showing varying shades of red, which comprises applying to the trees on which said apples are formed during the growing season, a spray including an alkali metal thiocyanate.

11. A method of treating the fruit and other aerial parts of fruit-bearing plants of the type wherein the fruit ripens with a change of green to yellow color, which comprises applying to the fruit and other aerial parts of the fruit-bearing plants contemporaneously with the growing season, a water soluble compound consisting of a basic salt forming radical combined with a thiocyanic acid radical, said compound being applied in amounts effective to hasten the ripening process.

12. A method of treating a fruit which comprises applying to the fruit contemporaneously with the growing season an inorganic thiocyanate selected from the group consisting of alkali metal thiocyanates and alkaline earth metal thiocyanates in amounts effective in altering the color of the fruit.

13. A method of treating a fruit and the aerial parts of a fruit-growing plant which comprises applying thereto during the growing season at intervals a spray containing a thiocyanate which consists of a basic salt forming radical combined with a thiocyanic acid radical.

14. A method of treating fruits and fruit-bearing plants at intervals during the growing season which comprises spraying the fruits and the aerial parts of the fruit-bearing plants with a spray containing a thiocyanate selected from the group consisting of alkali metal and alkaline earth metal thiocyanates in concentrations within the range of a few hundredths of one percent to about 0.2%.

15. A method for increasing the amount of pigment in apples showing varying shades of red which comprises applying to the trees on which said apples are formed, during the growing season, a spray including an alkaline earth metal thiocyanate.

ROBERT B. DUSTMAN.